March 4, 1952 H. R. HOLMES Re. 23,465

WHEEL CONSTRUCTION FOR FRONT WHEEL DRIVES

Original Filed May 6, 1943 2 SHEETS—SHEET 1

HARLEIGH R. HOLMES
INVENTOR.

BY Martin E. Anderson
Attorney

WHEEL CONSTRUCTION FOR FRONT WHEEL DRIVES

Original Filed May 6, 1943 2 SHEETS—SHEET 2

HARLEIGH R. HOLMES
*INVENTOR.*

BY Martin E. Anderson
Attorney

Reissued Mar. 4, 1952 Re. 23,465

UNITED STATES PATENT OFFICE 23,465

WHEEL CONSTRUCTION FOR FRONT WHEEL DRIVES

Harleigh R. Holmes, Littleton, Colo., assignor to Coleman Motors Corporation, Littleton, Colo., a corporation of Colorado Original No. 2,346,842, dated April 18, 1944, Serial No. 485,937, May 6, 1943. Application for reissue November 7, 1951, Serial No. 255,241

4 Claims. (Cl. 180—48)

Matter enclosed in heavy brackets [ ] appears in the original patent but forms no part of this reissue specification; matter printed in italics indicates the additions made by reissue.

This invention relates to improvement in wheel mountings for front wheel drive vehicles and relates more particularly to an improved construction of the type described and claimed in U. S. Patent 1,619,672 granted on March 1, 1927.

The importance of four wheel drive for heavy duty trucks has long been recognized and such trucks are now extensively employed. Front wheel drive for pleasure cars also has many points of merit.

Front wheel drives are not as simple as other drives for the reason that the front wheels are also used for steering and means for transmitting power must therefore be so designed that this can be effected without interfering with the steering. In the patent above identified, a power transmission device admirably adapted for front wheel drive has been shown, which is employed with slight variations, in the present invention. In heavy duty trucks, where four wheel drives are mostly employed, the parts are subjected to very severe strains, and although they are designed with this in view, it is evident that the parts will wear and means must therefore be provided for effecting adjustments.

In order that the wheels may be employed for steering they must be mounted so as to turn about vertical pivots. Since the weights that must be supported are large, the vertical pivots are positioned in the planes of the wheels, as clearly shown in Fig. 1 of the patent above identified. The vertical pivot bearings are, of course, of the antifriction type and must be adjusted from time to time to correct or compensate for wear. In the patent above identified, such adjustments are effected by means of the bolts 13.

It is the principal object of this invention to improve the construction shown in the above identified patent in such a way that adjustment for wear of the vertical pivot bearings can be effected without removing the wheels and which, therefore, makes it possible to keep the parts in proper adjustment with the expenditure of a comparatively small amount of labor.

Having thus pointed out the principal object of the invention the latter will now be described in detail and for this purpose reference will be had to the accompanying drawings in which the invention has been illustrated and in which Figure 1 is a diametrical section taken on line 1—1 Figure 2;

Figure 1:
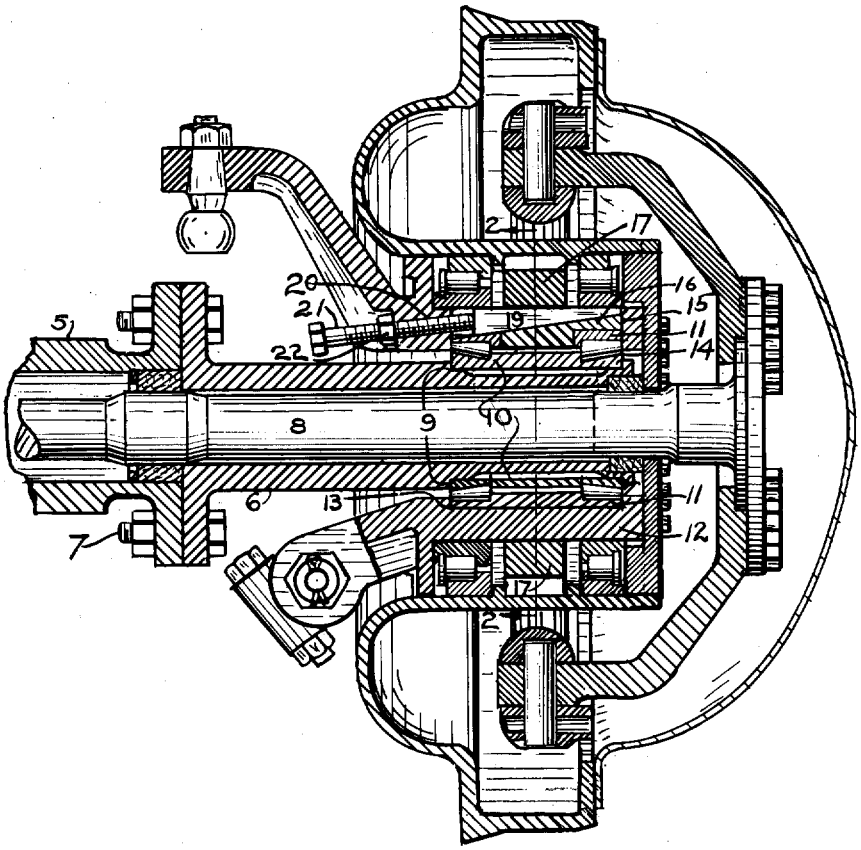

In the drawings, reference numeral 5 designates the axle housing and reference numeral 6 an extension secured thereto by bolts 7. The drive shaft has been designated by reference numeral 8. The hollow [extensions] *extension* 6 is provided on its upper and lower surfaces, near its outer end, with circular depressions, 9, for the reception of the inner bearing races, 10. The depressions, 9, are concentric and in parallel planes. The outer bearing races have been designated by numeral 11. A spindle, 12, of somewhat cylindrical form is provided in the lower part of its inner surface with a cylindrical seat 13 in which is seated the outer bearing race 11 of the lower bearing. It will be remarked that in the drawings frusto conical rollers, 14, have been shown but balls may be used if desired and the term "bearing race" is therefore employed. Spindle 12 is provided in upper part of its wall with a cylindrical opening 15, that is concentric with a diameter concentric with depression 13. The inner bearing race 10 of the upper bearing is seated in the upper depression 9 and the outer bearing race 11 is seated in and extends upwardly into opening 15. A bearing cap 16 is positioned in opening 15 and rests on the upper bearing race 11. A heavy steel ring 17 surrounds the spindle 12 and holds *a wedge 19 and cap 16 and* the upper bearing race in position. It will be observed that the bearing cap has a diametrical groove having an inclined bottom 18, in which is positioned [a] *the* wedge, 19.

Figure 2:
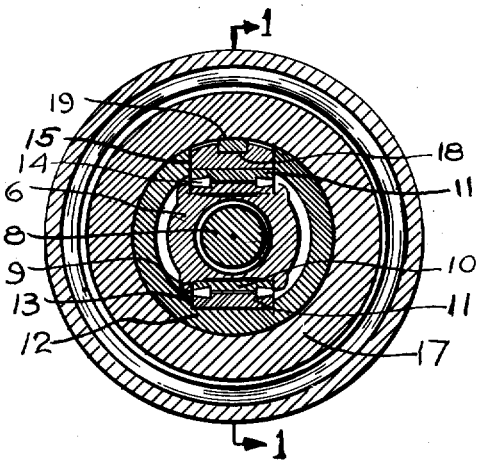
Figure 2 is a transverse section taken on line 2—2 Figure 1.

Spindle 12 has a threaded opening, 20, in which is operatively positioned a screw, 21, whose inner end abuts the [wide] *thick* end of the wedge. A lock nut, 22, serves to hold the screw from turning. By means of a suitable wrench applied to the head of screw 21 it may be turned and the wedge forced outwardly. The wedge being positioned between the [upper ball bearing] *cap 16* and the inner surface of ring 17 (Fig. 2) serves to adjust the bearings to compensate for wear.

Attention is directed to the fact that the head of screw 21 is so positioned that it is readily accessible and the bearings can therefore be quickly adjusted at any time. With the construction shown in the above patent it requires a large amount of time and labor to adjust the bearings by tightening bolts 13 as can be readily seen from an inspection of Figure 1, but with present construction this adjustment can be readily made.

Figure 3:
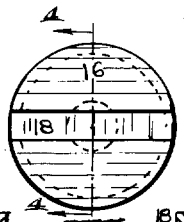
Figure 3 is a top plan view of the bearing cap.
Figure 4:
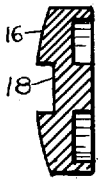
Figure 4 is a section taken on line 4—4 Figure 3.
Figure 5:
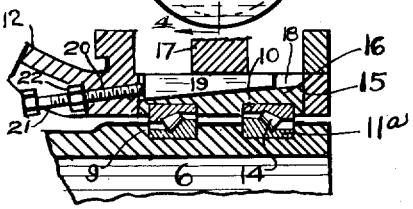
Figure 5 is a part section similar to the one shown in Figure 1 and shows a slightly modified construction.

In Figures 3 and 4 the bearing cap 16 has been shown *respectively* in top plan view and diametrical section and in Figure 5 the parts have been shown assembled. The difference between the embodiment illustrated in Figure 5 and that shown in Figures 1 and 2 resides mainly in the bearings, the [lower ball] *inner* races [10a] *11a* being annular and positioned in [an] annular [groove] *grooves* in the axle housing extension 6, the cones [16] *14* being somewhat differently inclined.

Having described the invention what is claimed as new is:

1. In a front wheel drive construction having an axle housing and a surrounding tubular spindle mounted for movement relative to the axle housing about a substantially vertical pivot, anti-friction bearings positioned between the spindle and the axle housing, one above and one below the axle housing, the latter having means for positioning the bearings in axial alignment, the inner surface of the tubular spindle having diametrically opposed bearing seats *each* for one of the races of a bearing, means positioned between the inner surface of the spindle and the corresponding bearing race for urging the bearing inwardly, said means comprising a wedge movable in the direction of the axis of the spindle, and means for moving the wedge comprising a screw operatively connected with the spindle and the wedge.

2. A front wheel drive construction having an axle housing, a tubular spindle surrounding an end thereof, two spindle bearings interposed between the axle housing and the spindle, one above and one below the axle housing, the lower surface of the spindle having a bearing seat, the wall of the spindle directly above the seat having an opening for the reception of a portion of the upper bearing, a bearing cap positioned in the opening and resting on the upper surface of the upper bearing, a steel ring [enclosing] *encircling* the spindle and positioned to form a [closure for the opening,] *retainer for the upper bearing and bearing cap,* the bearing cap having a diametrically extending surface inclined with respect to the inner surface of the ring, a wedge positioned between the ring and the inclined surface, and means comprising a screw operatively connected with the spindle and the wedge for moving the wedge towards the narrow end of the space in which it is positioned.

3. An adjustable spindle bearing for a front wheel drive vehicle comprising a hollow axle housing, the outer end of the housing having seats for the reception of bearing races, one in the upper and another in the lower surface, an anti-friction bearing comprising outer and inner races, spaced by rotatable elements, positioned in each seat, a tubular spindle surrounding the axle housing, the inner surface *of the spindle* having a seat for the reception of the outer race of one bearing, the spindle having an opening positioned diametrically opposite from the *spindle* seat, the outer race of the other bearing projecting into the opening, a bearing cap positioned in the opening and resting on the outer bearing race *of said other bearing,* a ring surrounding the spindle and positioned to extend over the opening, the outer surface of the bearing cap having a diametrical groove with a bottom inclined in the direction of the axis of the spindle, whereby a tapering space is formed between the bottom and the inner surface of the ring, a wedge positioned in the groove, and means comprising a screw threadedly engaging a portion of the spindle and positioned to engage the large end of the wedge for forcing it towards the narrow end of the space to adjust the bearings.

4. In a front wheel drive construction which includes an axle housing and a tubular spindle mounted for relative pivotal movement about a vertical pivot, the housing having its end provided with a seat for the reception of the [outer] *inner* race of [the] *a* lower bearing, the spindle having its wall provided with an opening diametrically above the lower *bearing* seat for the reception of the outer race of [the] *an* upper bearing, an anti-friction bearing below and another above the housing, a bearing cap positioned in the opening and resting on the upper bearing, a ring surrounding the spindle and positioned to at least partly close the opening, the outer surface of the bearing cap having a diametrical groove whose bottom is outwardly inclined whereby an outwardly tapered space is formed between the inner surface of the ring and the bottom of the groove, a wedge positioned in the tapered space, and means comprising a screw operatively associated with the spindle and the wedge for forcing the wedge towards the narrow end of the space to effect a tightening of the bearing.

HARLEIGH R. HOLMES.

REFERENCES CITED

The following references are of record in the file of this patent or the original patent:

UNITED STATES PATENTS

| Number | Name | Date |
|---|---|---|
| 1,619,672 | Holmes | Mar. 1, 1927 |